March 13, 1962 J. BERGER 3,024,697
PHOTOGRAPHIC OBJECTIVE FOR PICTURE-TAKING OR PROJECTION
Filed Oct. 31, 1960
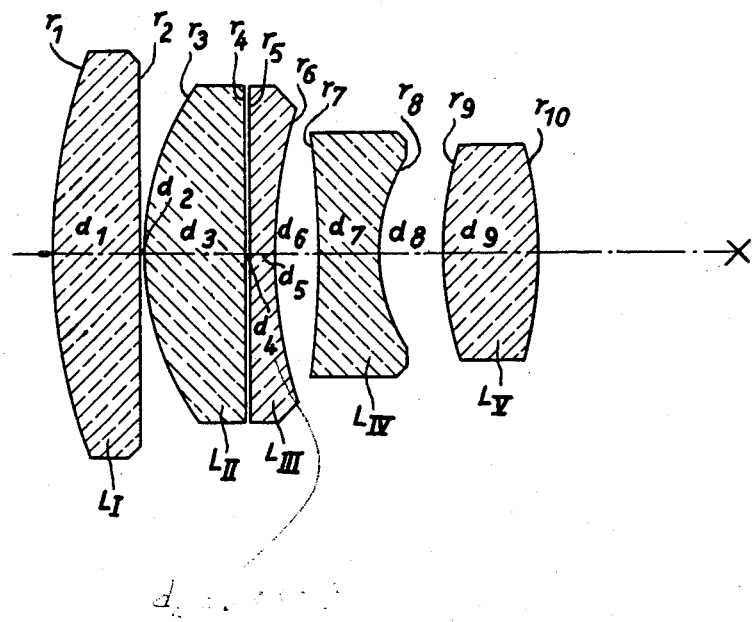

United States Patent Office 3,024,697
Patented Mar. 13, 1962

3,024,697
PHOTOGRAPHIC OBJECTIVE FOR PICTURE-
TAKING OR PROJECTION
Johannes Berger, Heidenheim (Brenz), Wurttemberg, Germany, assignor to Carl Zeiss, Heidenheim (Brenz), Wurttemberg, Germany
Filed Oct. 31, 1960, Ser. No. 66,353
Claims priority, application Germany Nov. 10, 1959
1 Claim. (Cl. 88—57)

The present invention concerns photographic objectives for picture-taking or for projection particularly objectives suitable for sub-standard film cameras or projectors. They consist of five lenses. The first lens—in objectives used for picture-taking the said lens is the lens turned towards the object and in objectives used for projection it is the lens turned towards the screen surface—is an asymmetrical collective lens which turns its surface of shallower curvature towards the second lens which second lens is also an asymmetrical collective lens which turns its surface of shallower curvature towards the third lens which third lens is an asymmetrical dispersive lens which turns its surface of deeper curvature towards the fourth lens which fourth lens is also an asymmetrical dispersive lens which turns its surface of deeper curvature towards the fifth lens which fifth lens is a biconvex collective lens.

The investigations on which the invention is based have shown that in objectives of the said design a correction suitable for the purpose indicated can be attained for angular fields of approximately ±12° and for an aperture ratio of $f{:}1.4$ if the following conditions are simultaneously satisfied:

(a)     $0.10 \cdot B < d_2 + d_4 + d_6 + d_8 < 0.30 \cdot f$ (b)     $0.70 \cdot f < B < 1.40 \cdot f$ (c)     $1.00 \cdot r_3 < r_1 < 3.50 \cdot r_3$ (d)     $1.00 \cdot r_3 < r_6 < 3.00 \cdot r_3$ (e)     $0.35 \cdot r_9 < r_8 < 0.70 \cdot r_9$ (f)     $0.80 \cdot r_9 < r_{10} < 1.80 \cdot r_9$ (g)     $0.40 \cdot d_8 < d_6$ wherein there are designated By $r$ the radii,
By $d$ the axial separations,
By $B$ the overall length, and
By $f$ the focal length of the objective.

With a view to the correction of the coma it is advantageous to cement the second and the third lens together.

A preferred form of the objective is illustrated in the accompanying FIGURE of the drawing.

In the following table there are indicated the design data for an objective according to the invention with a relative aperture of 1:1.4 and with an angular field of ±12°.

Therein there are designated:

By $L$ the lenses,
By $r$ the radii,
By $d$ the axial separations,
By $n_d$ the refractive indices,
By $\nu_d$ the Abbe numbers for the $d$-line of the Helium spectrum,
By $s'$ the back focal length,
By $\Delta n/r$ the surface refractive powers, and
By $f$ the focal length of the objective.

Within the scope of the present invention there are included also objectives with design data approximating so closely to the values taken from the appended table that each surface refractive power $(\Delta n/r)$ departs by a maximum of $\pm 0.30 \cdot 1/f$ and each axial separation departs by a maximum of $\pm 0.03 \cdot f$ from the corresponding value given in the table.

| Lenses | Radii | Axial separations | $n_d$ | $\nu_d$ | $\Delta n/r$ |
|---|---|---|---|---|---|
| $L_\text{I}$ | $r_1 = +1.13542 \cdot f$ | $d_1 = 0.1710 \cdot f$ | 1.62041 | 60.29 | $+0.5465/f$ |
|  | $r_2 = \infty$ | $d_2 = 0.0032 \cdot f$ |  |  | $0.0000/f$ |
| $L_\text{II}$ | $r_3 = +0.56892 \cdot f$ | $d_3 = 0.2072 \cdot f$ | 1.71300 | 53.89 | $+1.2533/f$ |
|  | $r_4 = \infty$ | $d_4 = 0.0000 \cdot f$ |  |  | $0.0000/f$ |
|  | $r_5 = \infty$ |  |  |  | $0.0000/f$ |
| $L_\text{III}$ |  | $d_5 = 0.0583 \cdot f$ | 1.63980 | 34.60 |  |
|  | $r_6 = +0.96898 \cdot f$ | $d_6 = 0.0745 \cdot f$ |  |  | $-0.6603/f$ |
|  | $r_7 = -0.62473 \cdot f$ |  |  |  | $-0.1256/f$ |
| $L_\text{IV}$ |  | $d_7 = 0.1366 \cdot f$ | 1.78470 | 26.10 |  |
|  | $r_8 = +0.34380 \cdot f$ | $d_8 = 0.1243 \cdot f$ |  |  | $-2.2824/f$ |
|  | $r_9 = +0.67126 \cdot f$ |  |  |  | $+1.1084/f$ |
| $L_\text{V}$ |  | $d_9 = 0.1813 \cdot f$ | 1.74400 | 44.90 |  |
|  | $r_{10} = -0.80934 \cdot f$ |  |  |  | $-0.9193/$ |

Note.—$s' = 0.4030 \cdot f$.

I claim:
A photographic objective for picture-taking and projection consisting of five lenses wherein the first lens is an asymmetrical collective lens which turns its surface of weaker curvature towards the second lens, which second lens is also an asymmetrical collective lens which turns its surface of weaker curvature towards the third lens, which third lens is an asymmetrical dispersive lens which turns its surface of stronger curvature towards the fourth lens, which fourth lens is also an asymmetrical dispersive lens which turns its surface of stronger curvature towards the fifth lens, which fifth lens is a biconvex collective lens characterized in that the following conditions are simultaneously satisfied:

(a) $\quad 0.10 \cdot B < d_2 + d_4 + d_6 + d_8 < 0.30 \cdot B$ (b) $\quad 0.70 \cdot f < B < 1.40 \cdot f$ (c) $\quad 1.00 \cdot r_3 < r_1 < 3.50 \cdot r_3$ (d) $\quad 1.00 \cdot r_3 < r_6 < 3.00 \cdot r_3$ (e) $\quad 0.35 \cdot r_9 < r_8 < 0.70 \cdot r_9$ (f) $\quad 0.80 \cdot r_9 < r_{10} < 1.80 \cdot r_9$ (g) $\quad 0.40 \cdot d_8 < d_6$ wherein there are designated By $r$ the radii,
By $d$ the axial separations,
By $B$ the overall length, and
By $f$ the focal length of the objective and furthermore, characterized in that its design data approximate so closely to the values taken from the appended table that none of the surface refractive powers ($\Delta n/r$ differs absolutely by more than $0.30 \cdot 1/f$ and none of the axial separations ($d$) differs absolutely by more than $0.03 \cdot f$ from the corresponding value given in the table:

| Lenses | Radii | Axial separations | $n_d$ | $v_d$ | $\Delta n/r$ |
|---|---|---|---|---|---|
| $L_I$ | $r_1 = +1.13542 \cdot f$ | | 1.62041 | 60.29 | $+0.5465/f$ |
| | $r_2 = \infty$ | $d_1 = 0.1710 \cdot f$ | | | $0.0000/f$ |
| $L_{II}$ | $r_3 = +0.56892 \cdot f$ | $d_2 = 0.0032 \cdot f$ | 1.71300 | 53.89 | $+1.2533/f$ |
| | $r_4 = \infty$ | $d_3 = 0.2072 \cdot f$ | | | $0.0000/f$ |
| $L_{III}$ | $r_5 = \infty$ | $d_4 = 0.0000 \cdot f$ | 1.63980 | 34.60 | $0.0000/f$ |
| | $r_6 = +0.96898 \cdot f$ | $d_5 = 0.0583 \cdot f$ | | | $-0.6603/f$ |
| $L_{IV}$ | $r_7 = -0.62473 \cdot f$ | $d_6 = 0.0745 \cdot f$ | 1.78470 | 26.10 | $-0.1256/f$ |
| | $r_8 = +0.34380 \cdot f$ | $d_7 = 0.1366 \cdot f$ | | | $-2.2824/f$ |
| $L_V$ | $r_9 = +0.67126 \cdot f$ | $d_8 = 0.1243 \cdot f$ | 1.74400 | 44.90 | $+1.1084/f$ |
| | $r_{10} = -0.80934 \cdot f$ | $d_9 = 0.1813 \cdot f$ | | | $-0.9193/f$ |

NOTE.—$s' = 0.4030 \cdot f$.

References Cited in the file of this patent
UNITED STATES PATENTS 2,502,509    Cook   ------------------ Apr. 4, 1950
2,600,208    Cook   ------------------ June 10, 1952